United States Patent
Porter (10) Patent No.: US 12,300,834 B2
(45) Date of Patent: May 13, 2025

(54) WEARABLE MOBILE ELECTRONIC SYSTEM

(71) Applicant: Vuzix Corporation, West Henrietta, NY (US)

(72) Inventor: Tyler W. Porter, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 825 days.

(21) Appl. No.: 17/420,559

(22) PCT Filed: Jan. 4, 2020

(86) PCT No.: PCT/US2020/012294
§ 371 (c)(1),
(2) Date: Jul. 2, 2021

(87) PCT Pub. No.: WO2020/142757
PCT Pub. Date: Jul. 9, 2020

(65) Prior Publication Data
US 2021/0391620 A1 Dec. 16, 2021

Related U.S. Application Data (60) Provisional application No. 62/788,754, filed on Jan. 4, 2019.

(51) Int. Cl.
*H01M 50/213* (2021.01)
*H01M 50/247* (2021.01)
(Continued)

(52) U.S. Cl.
CPC ....... *H01M 50/213* (2021.01); *H01M 50/247* (2021.01); *H02J 7/0044* (2013.01); *H01M 50/284* (2021.01); *H01M 2220/30* (2013.01)

(58) Field of Classification Search
CPC ............. H01M 50/213; H01M 50/247; H01M 50/284; H01M 2220/30
See application file for complete search history.

(56) References Cited

U.S. PATENT DOCUMENTS

| 4,450,495 A | 5/1984 | Naruki |
| D755,752 S | 5/2016 | Lee et al. |

(Continued)

FOREIGN PATENT DOCUMENTS

| CN | 201383874 Y | 1/2010 |
| CN | 202511218 | * 10/2012 |

(Continued)

OTHER PUBLICATIONS

International Search Report and Written Opinion, mailed Mar. 24, 2020, in PCT/US2020/012294.

(Continued)

*Primary Examiner* — Brittany L Raymond
(74) *Attorney, Agent, or Firm* — Harter Secrest & Emery LLP; Jacob D. Merrill, Esq.

(57) ABSTRACT

A mobile electronic system including a left battery section coupled with a left flexible section, a right battery section coupled with a right flexible section, an electronic section coupled with the left flexible section opposite the left battery section, and coupled with the right flexible section opposite the right battery section. The mobile electronic system further including a circuit board located within the electronic section, a first battery located within the left battery section, and a left electrical wire assembly located within the left flexible section. The left electrical wire assembly electrically connecting the first battery with the circuit board. The right and left flexible sections comprise a flexible material operable to retain a flexed position.

20 Claims, 12 Drawing Sheets

(51) Int. Cl.
*H01M 50/284* (2021.01)
*H02J 7/00* (2006.01)

(56) References Cited

U.S. PATENT DOCUMENTS

| | | | |
|---|---|---|---|
| D774,017 S | 12/2016 | Ahn et al. |
| D777,137 S | 1/2017 | Erbeus |
| D800,088 S | 10/2017 | Kim et al. |
| D800,090 S | 10/2017 | Ahn et al. |
| D802,557 S | 11/2017 | Kumano |
| D802,558 S | 11/2017 | Kim et al. |
| 10,061,352 B1 | 8/2018 | Trail |
| D830,998 S | 10/2018 | Kim et al. |
| D831,611 S | 10/2018 | Kim et al. |
| D832,815 S | 11/2018 | Park et al. |
| D832,816 S | 11/2018 | Park et al. |
| D832,817 S | 11/2018 | Park et al. |
| D832,819 S | 11/2018 | Park et al. |
| D840,968 S | 2/2019 | Shin et al. |
| D842,837 S | 3/2019 | Li |
| D843,968 S | 3/2019 | Li |
| D843,969 S | 3/2019 | Li |
| D845,270 S | 4/2019 | Weber |
| D851,061 S | 6/2019 | Zeng et al. |
| D851,625 S | 6/2019 | Mackiewicz et al. |
| 10,317,939 B2 | 6/2019 | Fukuda et al. |
| D853,987 S | 7/2019 | Kelley et al. |
| D854,512 S | 7/2019 | Huang |
| D855,582 S | 8/2019 | Shin et al. |
| D856,965 S | 8/2019 | Shin et al. |
| D856,966 S | 8/2019 | Shin et al. |
| D856,972 S | 8/2019 | Shin et al. |
| D858,480 S | 9/2019 | Weber |
| 10,474,192 B2 | 11/2019 | Song et al. |
| D870,067 S | 12/2019 | Hu |
| D875,712 S | 2/2020 | Park et al. |
| D876,390 S | 2/2020 | Kim et al. |
| D876,391 S | 2/2020 | Kim et al. |
| D878,326 S | 3/2020 | Kiong et al. |
| D878,330 S | 3/2020 | Lee et al. |
| D879,743 S | 3/2020 | Lee et al. |
| D890,126 S | 7/2020 | Lee et al. |
| D890,130 S | 7/2020 | Huang |
| D890,717 S | 7/2020 | Lee et al. |
| D890,718 S | 7/2020 | Lee et al. |
| D911,305 S | 2/2021 | Yook |
| D913,076 S | 3/2021 | Lu et al. |
| D919,592 S | 5/2021 | Trought et al. |
| D926,155 S | 7/2021 | Kim et al. |
| D930,611 S | 9/2021 | Kim et al. |
| D933,633 S | 10/2021 | Terazaki |
| 2004/0032964 A1 | 2/2004 | Liang |
| 2013/0044215 A1 | 2/2013 | Rothkopf et al. |
| 2013/0106603 A1* | 5/2013 | Weast .................... G06F 1/163 340/539.11 |
| 2013/0121015 A1 | 5/2013 | Tjalsma |
| 2015/0124415 A1 | 5/2015 | Goyal et al. |
| 2015/0138699 A1 | 5/2015 | Yamazaki |
| 2016/0050487 A1 | 2/2016 | Kim |
| 2016/0104451 A1 | 4/2016 | Sahin |
| 2016/0216512 A1 | 7/2016 | Miller et al. |
| 2017/0085688 A1 | 3/2017 | Zhou et al. |
| 2017/0264991 A1 | 9/2017 | Horst et al. |
| 2017/0308115 A1 | 10/2017 | Fukuda et al. |
| 2017/0367423 A1 | 12/2017 | Reitz et al. |
| 2018/0063620 A1 | 3/2018 | Kim et al. |
| 2018/0184727 A1 | 7/2018 | Petruschka et al. |
| 2018/0203239 A1 | 7/2018 | Lee et al. |
| 2018/0321497 A1 | 11/2018 | Yu |
| 2018/0373291 A1 | 12/2018 | Fukuda |
| 2019/0079599 A1 | 3/2019 | Lee et al. |
| 2020/0161712 A1 | 5/2020 | Kim |
| 2021/0325683 A1 | 10/2021 | Yee et al. |
| 2021/0337288 A1 | 10/2021 | Peng et al. |

FOREIGN PATENT DOCUMENTS

| | | |
|---|---|---|
| CN | 202511218 U | 10/2012 |
| CN | 203691071 U | 7/2014 |
| CN | 104872871 A | 9/2015 |
| CN | 204671169 U | 9/2015 |
| CN | 204761669 U | 11/2015 |
| CN | 105243860 A | 1/2016 |
| CN | 206597023 U | 10/2017 |
| CN | 207070263 U | 3/2018 |
| EP | 2640170 A1 | 9/2013 |
| IL | 249867 A0 | 3/2017 |
| JP | 3072445 U | 10/2000 |
| JP | 2013-143997 A | 7/2013 |
| KR | 20150046475 A | 4/2015 |
| TW | M490709 U | 11/2014 |
| WO | 8000516 A1 | 3/1980 |
| WO | 2017023058 A2 | 2/2017 |
| WO | 2017188244 A1 | 11/2017 |
| WO | 2018207202 A1 | 11/2018 |
| WO | WO 2018-207202 * | 11/2018 |
| WO | 2018229597 A1 | 12/2018 |

OTHER PUBLICATIONS

"Flexible 12 LED Light," MonotaRO Co., Ltd., available online at <https://www.monotaro.com/p/4537/7814> accessed Jun. 10, 2024.

* cited by examiner

WEARABLE MOBILE ELECTRONIC SYSTEM

TECHNICAL FIELD

The present disclosure relates generally to wearable mobile electronics, and more specifically to a wearable mobile electronic system having a power source operable to supply mobile electronics.

BACKGROUND

Mobile electronics, such as, but not limited to, smart phones, virtual and augmented reality smart eye glasses, and Head-Mounted Displays (HMDs), all require an electrical power source to power the electronics therein. Due to the limited space within mobile electronics, the size of the power source therein, and hence the power density of the power source, is limited. This space restriction places a utilization lifetime on mobile electronics. Hence, most mobile electronics include integrated rechargeable batteries.

In addition to the rechargeable batteries within mobile electronics, conventional external battery packs may be connected thereto. Such conventional external battery packs may be carried in a pocket or purse and may be connected by wire to the mobile electronic device to be powered. The placement of such conventional external battery packs in pockets and/or purses is awkward for the user. Therefore, the redesign of a mobile external power source for increased user comfort, accessibility, and ease of removal from connection with mobile electronics would be advantageous.

SUMMARY

The present disclosure provides for a wearable mobile electronics system comprising a flexible electronics package, the flexible electronics package housing at least a battery such that flexible electronics package can be worn around a user's neck and be adjusted to fit the user. In addition to the battery, electronics such as a power regulator, battery power level monitor, charging means, GPS receiver, a Wi-Fi integrated circuit chip, a Bluetooth integrated circuit, a magnetometer, a computer processing unit, and computer memory may be included within the flexible electronics package. Electrical connection ports providing means to connect external electronic devices may be incorporated into the flexible electronics package.

In a second exemplary embodiment, a mobile electronic system includes a left battery section coupled with a left flexible section, a right battery section coupled with a right flexible section, an electronic section coupled with the left flexible section opposite the left battery section, and coupled with the right flexible section opposite the right battery section. The mobile electronic system further including a circuit board located within the electronic section, a first battery located within the left battery section, and a left electrical wire assembly located within the left flexible section. The left electrical wire assembly electrically connecting the first battery with the circuit board. The right and left flexible sections comprising a flexible material operable to retain a flexed position.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
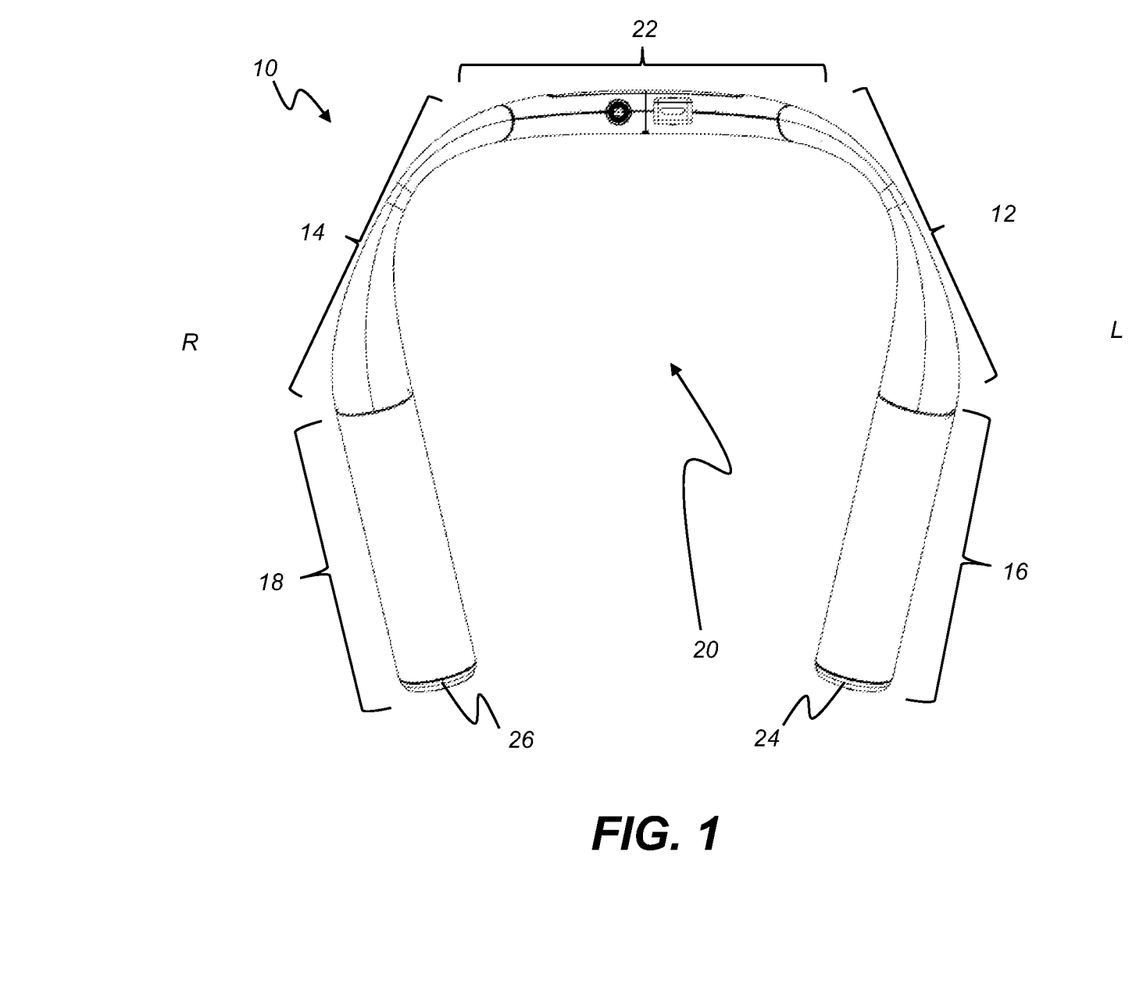
FIG. 1 illustrates a wearable mobile electronic system according to an embodiment of the present disclosure.
Figure 9:
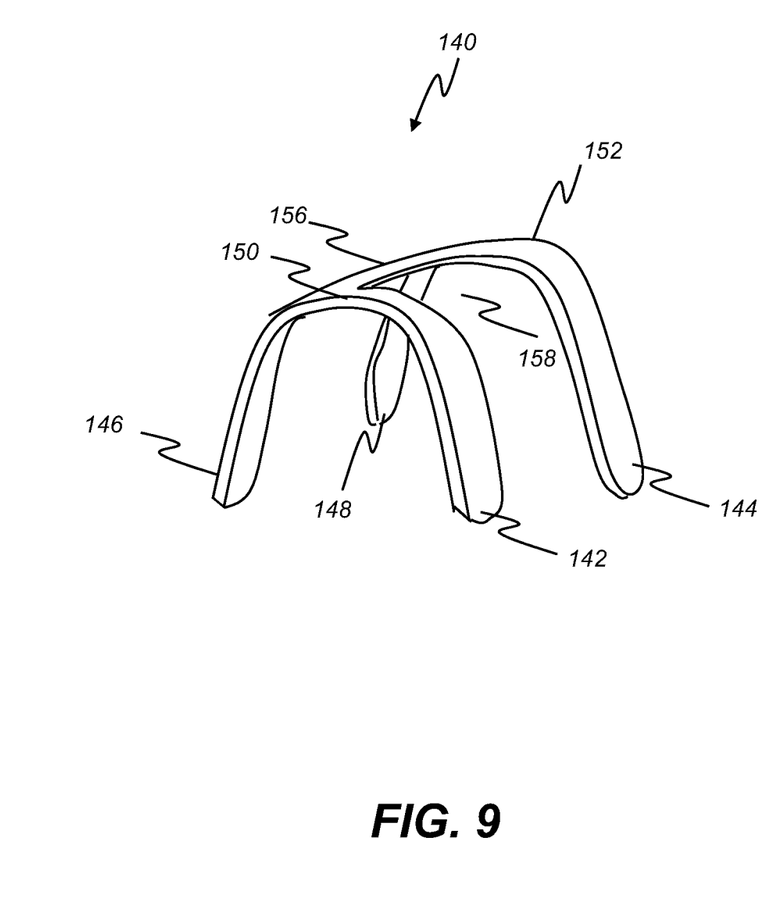
FIG. 9 illustrates a perspective view of a wearable mobile electronic system according to another embodiment of the present disclosure.
Figures 10A, 10B:
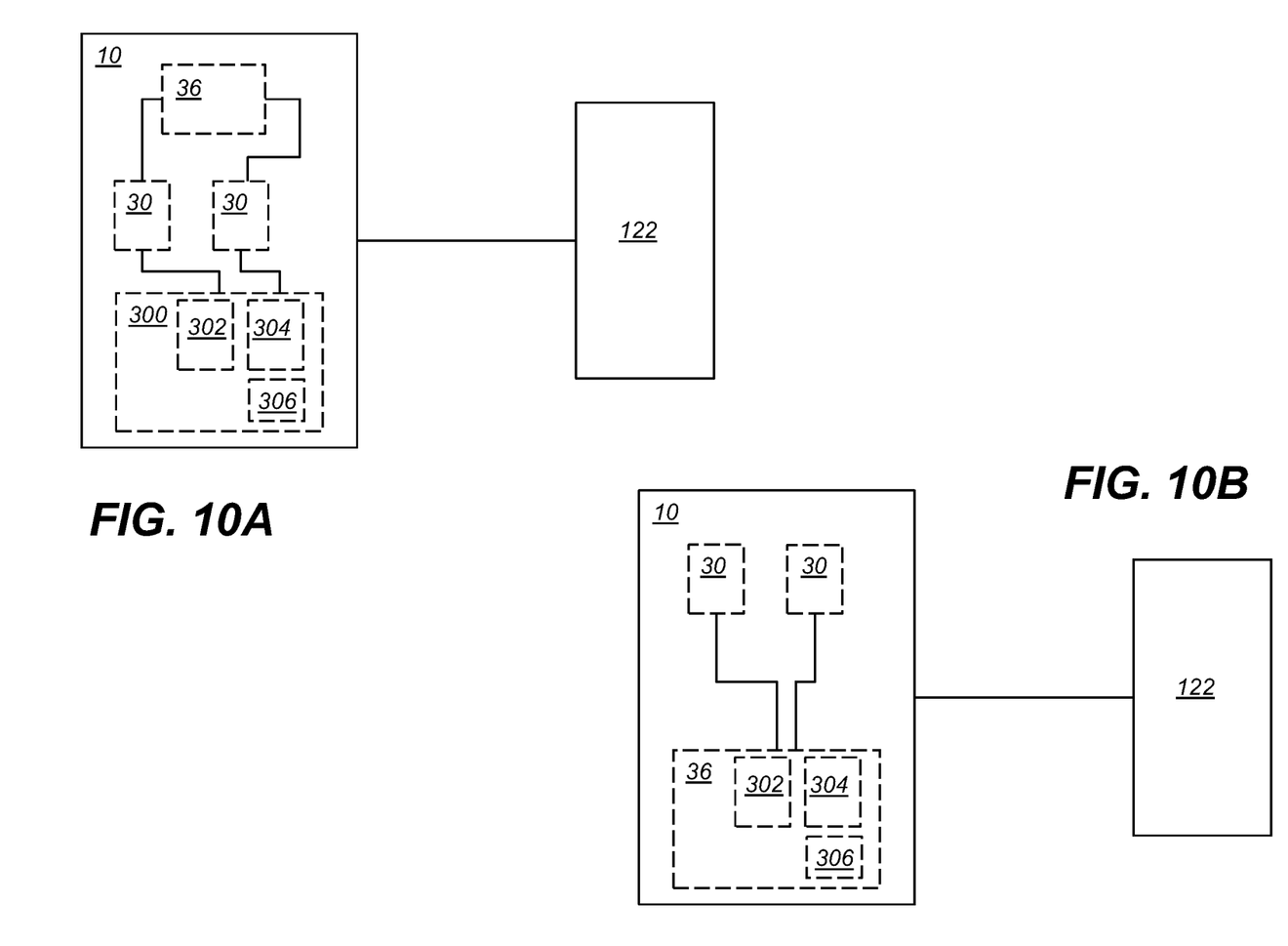
FIG. 10A shows a schematic diagram of a portion of a wearable mobile electronic system according to an embodiment of the present disclosure.
FIG. 10B shows a schematic diagram of a portion of a wearable mobile electronic system according to another embodiment of the present disclosure.

A wearable mobile electronic system may be utilized to extend the time a mobile electronic device, such as, but not limited to, virtual/augmented reality glasses or a near-eye display, may be utilized before recharging the mobile electronic device integrated battery via a stationary power source. As illustrated in FIGS. 1 and 10, in an embodiment, the wearable mobile electronic system may comprise an electronic torc system 10, 200. As illustrated in FIG. 9, in another embodiment, the wearable mobile electronic system may comprise an electronic yoke system 140. The electronic torc system 10 may also be referred to herein as an electronic collar system. The electronic yoke system 140 may also be referred to herein as an electronic harness system.

As illustrated in FIG. 1, in an embodiment, the electronic torc system 10 comprises a left battery section 16, a right battery section 18, a left flexible section 12, a right flexible section 14, and an electronic section 22. The left and right flexible sections 12, 14 enable the electronic torc system 10 to be adjusted to fit the particular wearer of the electronic torc system 10. In an embodiment, the left and right flexible sections 12, 14 comprise a flexible gooseneck tubing to facilitate the ability of the electronic torc system 10 to hold a position after adjustments have been made. As illustrated in FIGS. 5-8, the electronic torc system 10 may be operable to be located at least partially about a wearer's neck and rest at least partially on a left and right shoulder of the wearer. In other words, the electronic torc system 10 is operable to be located at least partially on and about the left and right trapezius muscles of the wearer. The wearer's head may be disposed generally through a semi-circular opening 20 defined by the electronic torc system 10.

Figure 2A:
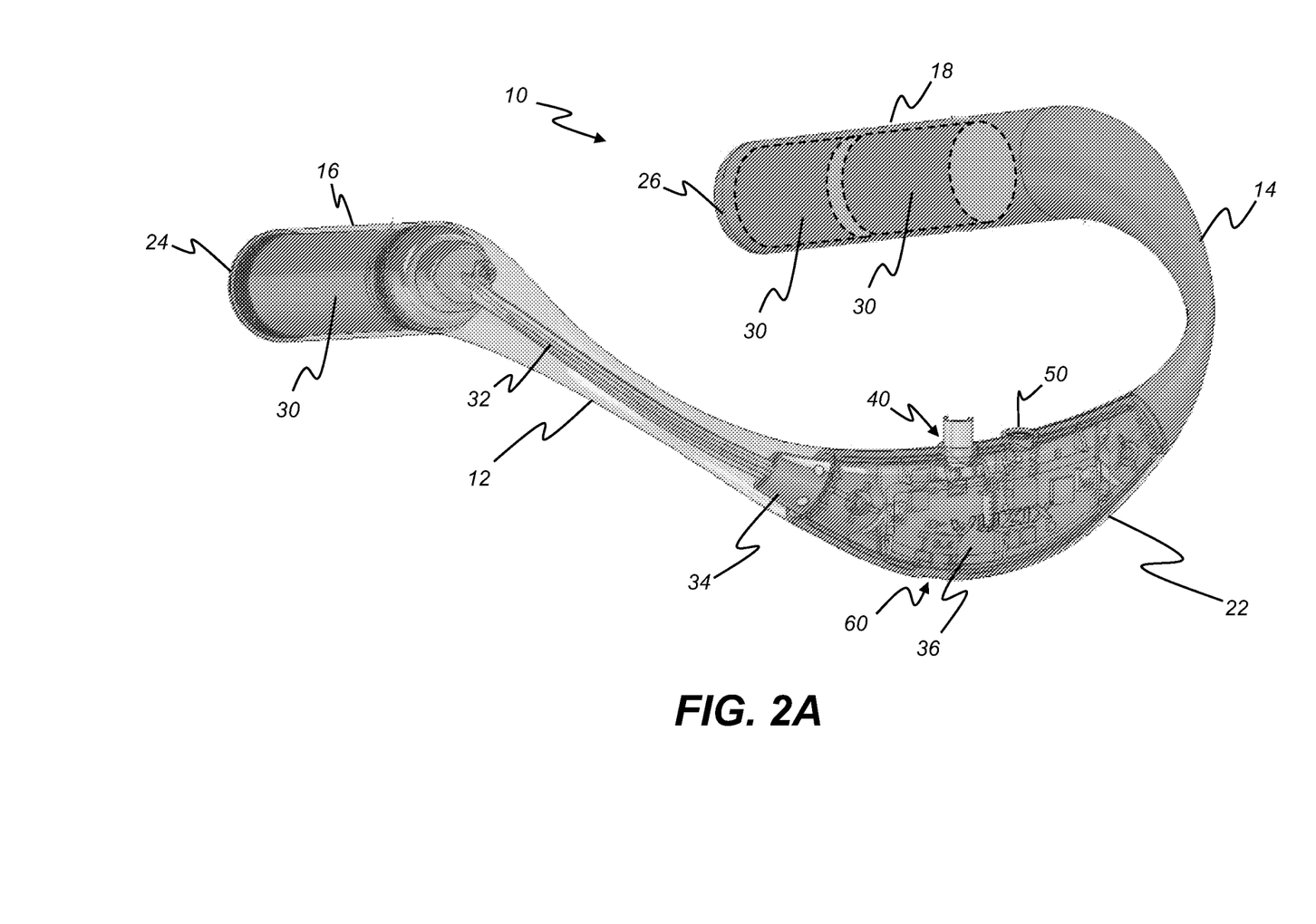
FIG. 2A illustrates a cut-away view of a wearable mobile electronic system according to an embodiment of the present disclosure.

In an embodiment, as illustrated in FIG. 2A, the left battery section 16 may include one or more rechargeable batteries 30, and the right battery section 18 may include one or more rechargeable batteries 30. In an embodiment, the batteries 30 are fixedly integrated with the electronic torc system 10 such that the batteries 30 are not removed except for maintenance, repair, and or replacement. In another embodiment, the batteries 30 are removable from the electronic torc system 10 for recharging or replacement. The left battery section 16 may include a removable cap 24 selectively coupled with an outside end thereof. Similarly, the right battery section 18 may comprise a right removable cap 26 selectively coupled with an outside end thereof. In an embodiment, the left and right removable caps 24, 26 may comprise male threads for engagement with corresponding female threads disposed in the outside end of the left and right battery sections 16, 18. In another embodiment, the left and right removable caps 24, 26 may comprise one or more resilient members, such as but not limited to, a flexible tab for engagement with a corresponding lip and/or recess disposed in the outside end of the left and right battery sections 16, 18.

The left and right removable caps 24, 26 may be utilized to access and/or remove the rechargeable batteries 30. Left battery section 16 and right battery section 18 may also include illumination means. In an embodiment, the illumination means may be mounted to a radially outer surface of the left and right battery sections 16, 18. In another embodiment, the illumination means may be disposed in the left and right removable caps 24, 26. The illumination means may be, but are not limited to, one or more light emitting diodes (LED) that may assist the wearer's perception of the wearer's environment and/or provide safety identification lighting.

Flexible sections 12, 14 provide means for electrically connecting the batteries 30 within the left and right battery sections 16, 18 with the electronic section 22. In an embodiment, the flexible sections 12, 14 comprise one or more electrical wires 32 and/or cable assemblies disposed at least partially within the left and right flexible sections 12, 14 for electrically connecting batteries 30 with the electronic section 22.

FIG. 2A is a perspective view of an electronic torc system 10 with cut-away view of the electronic section 22, left flexible section 12 and left battery section 16. Left battery section 16 houses the battery 30. In an embodiment, battery 30 may be a rechargeable battery. In another embodiment, the battery 30 may be a single-use battery. Battery 30 may be removable from left battery section 16 via decoupling the removable left cap 24 from the left battery section 16. Left flexible section 12 contains the wires 32 for electrically connecting the battery 30 to a connector 34 of circuit board 36. In addition, the left flexible section 12 and wires 32 are flexible, allowing for and facilitating adjustment of the shape of the electronic torc system 10.

In an embodiment, the electronic section 22 contains the circuit board 36. Circuit board 36 may comprise one or more electronic modules. For example, circuit board 36 may include a WiFi module, a Bluetooth module, a battery recharging induction coil, an electrical power monitoring and regulating module, a computer programming unit (CPU) module, a computer memory module, a GPS module, a magnetometer module, a tilt-tip orientation sensor module (e.g., inclinometer), an accelerometer module, a temperature sensor module, a humidity sensor module, and an environment illumination detection module. These modules may also be referred to as integrated circuits or integrated circuit chips. In an embodiment, the circuit board 36 comprises a controller 36A (e.g., MCU) operable to send and receive signals to and from the other components of the circuit board 36. The controller 36A is operable to control the charging of batteries 30. Circuit board 36 may further comprise one or more electrical connection ports such as, but not limited to, external power supply port 60, external electronics (e.g., virtual reality smart glasses) connection port 40, and external audio connection port 50. In an embodiment, the external audio connection portion 50 is located generally at the top of the torc system electronic section 22. For example, the external audio connection port 50 may be utilized with headphones and/or one or more ear buds. In an embodiment, the audio connection port 50 utilizes an audio jack type connector. In another embodiment, the audio connection port 50 utilizes a lightning (8-pin) type connector. In yet another embodiment, the audio connection port 50 utilizes a USB-C type connector. The external electronics connection port 40 may also be located at the top of the torc system electronic section 22. Additional electrical connection ports may also be included with the circuit board 36 and electronic section 22 for, but not limited to, computer memory expansion and/or a subscriber identification module (SIM) card.

It is to be understood that the right flexible section 14 and right battery section 18 may contain similar components as the left flexible section 12 and the left battery section 16 described above. Further, the circuit board 36 contains electrical connection to wires within right flexible section 14 providing electrical connection to the one or more batteries 30 within the right battery section 18.

Figure 2B:
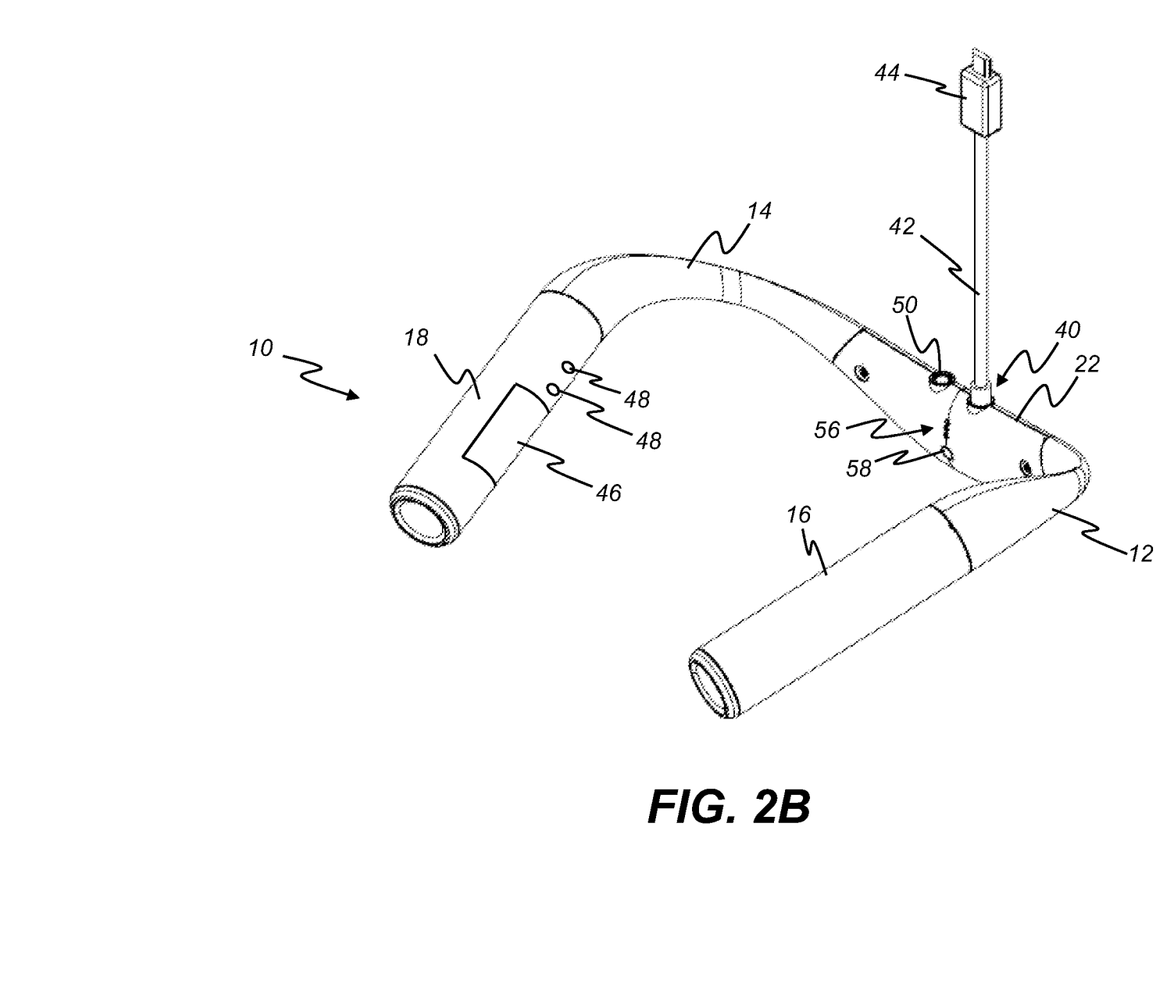
FIG. 2B illustrates a perspective view of a wearable mobile electronic system according to an embodiment of the present disclosure.

As illustrated in FIG. 2B, in an embodiment, the right battery section 18 includes a touchpad 46 and/or one or more buttons 48. The touchpad 46 and/or the navigation buttons 48 are operable to control the function and features of the electronic torc system 10. In an embodiment, the touchpad 46 and/or the navigation buttons 48 may be operable to control features of electronic devices (e.g., electronic glasses) coupled therewith. The electronic torc system 10 also includes a light emitting diode (LED) indicator 56 operable to visually indicate the amount of charge in the batteries 30. The LED indicator 56 may comprise three vertically aligned LED's and be prompted to indicate the charge level of the batteries 30 by depressing a button 58.

Figure 2C:
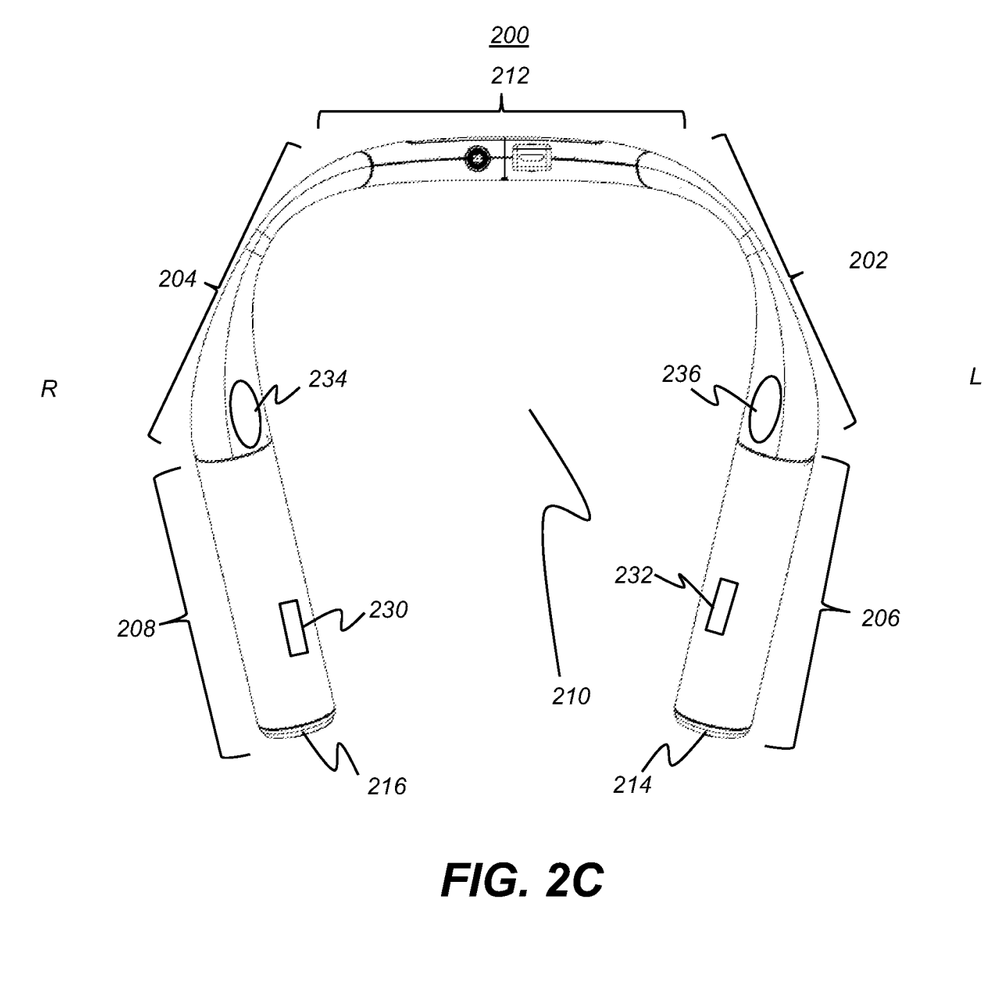
FIG. 2C illustrates a wearable mobile electronic system according to another embodiment of the present disclosure.

As illustrated in FIG. 2C, in an embodiment, an electronic torc system 200 may include audio speakers 234, 236 integrated into the left and right flexible sections 202, 204, respectively. In addition, the left and right battery sections 206, 208 of the electronic torc system 200 may include one or more integrated microphones 230, 232. In another embodiment, the audio speakers 234, 236 may be integrated into the left and right battery sections 206, 208, respectively. In yet another embodiment, the audio speakers 234, 236 may be integrated into the electronics section 212.

Figure 3:
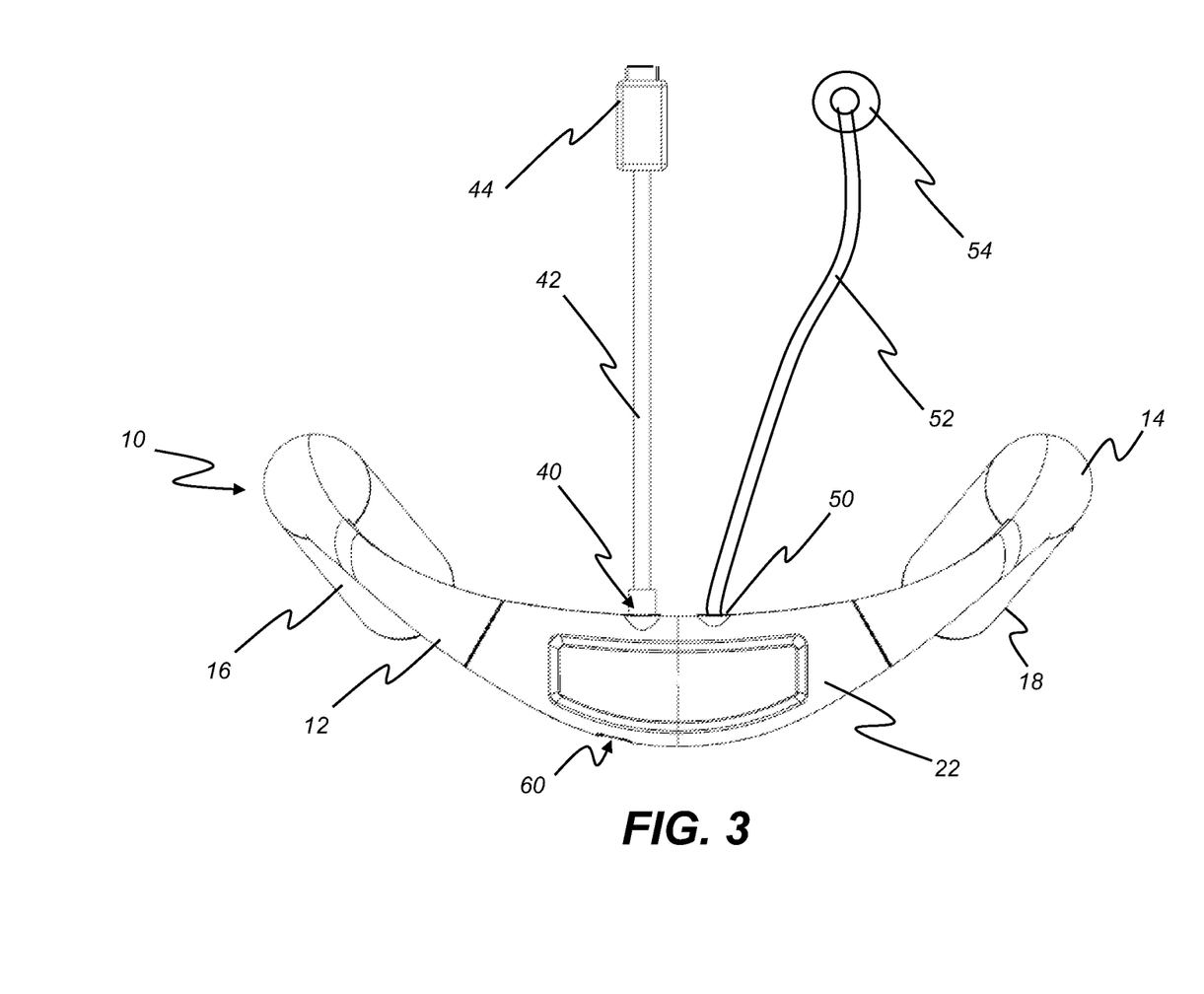
FIG. 3 illustrates a wearable mobile electronic system with removable cables coupled therewith according to an embodiment of the present disclosure.

FIG. 3 is a rear view illustration of the electronic torc system 10 with an electrical wire assembly 42 connected to the external electronics connection port 40 of the circuit board 36. The electrical wire assembly 42 comprises an electrical connector 44 for connecting to external electronic devices. In an embodiment, the electrical connector 44 may be a USB connector or mini-USB connector. In another embodiment, the electrical connector 44 may be a USB Type-C connector. The electrical wire assembly 42 may be used to convey electrical power and/or electronic data and/or commands to and/or from an external device that is engaged with the electrical connector 44. In an embodiment, the electrical wire assembly 42 is detachable and may be selectively coupled/decoupled from the circuit board 36 via the external electronics connection port 40 such that, for example, wire assemblies having different electrical connectors can be interchangeably utilized with the electronic torc system 10 to facilitate operation with a number of external devices. In another embodiment, the electrical wire assembly 52 may be permanently coupled with the circuit board 36 via the external electronics connection port 40. Referring still to FIG. 3, in an embodiment, an electrical wire assembly 52 is removably connected with the audio connection port 50. In an embodiment, as illustrated in FIG. 3, the electrical wire assembly 52 includes one or more ear buds 54 such that a wearer may receive audio signals—converted into sound—thereby.

Figure 4:
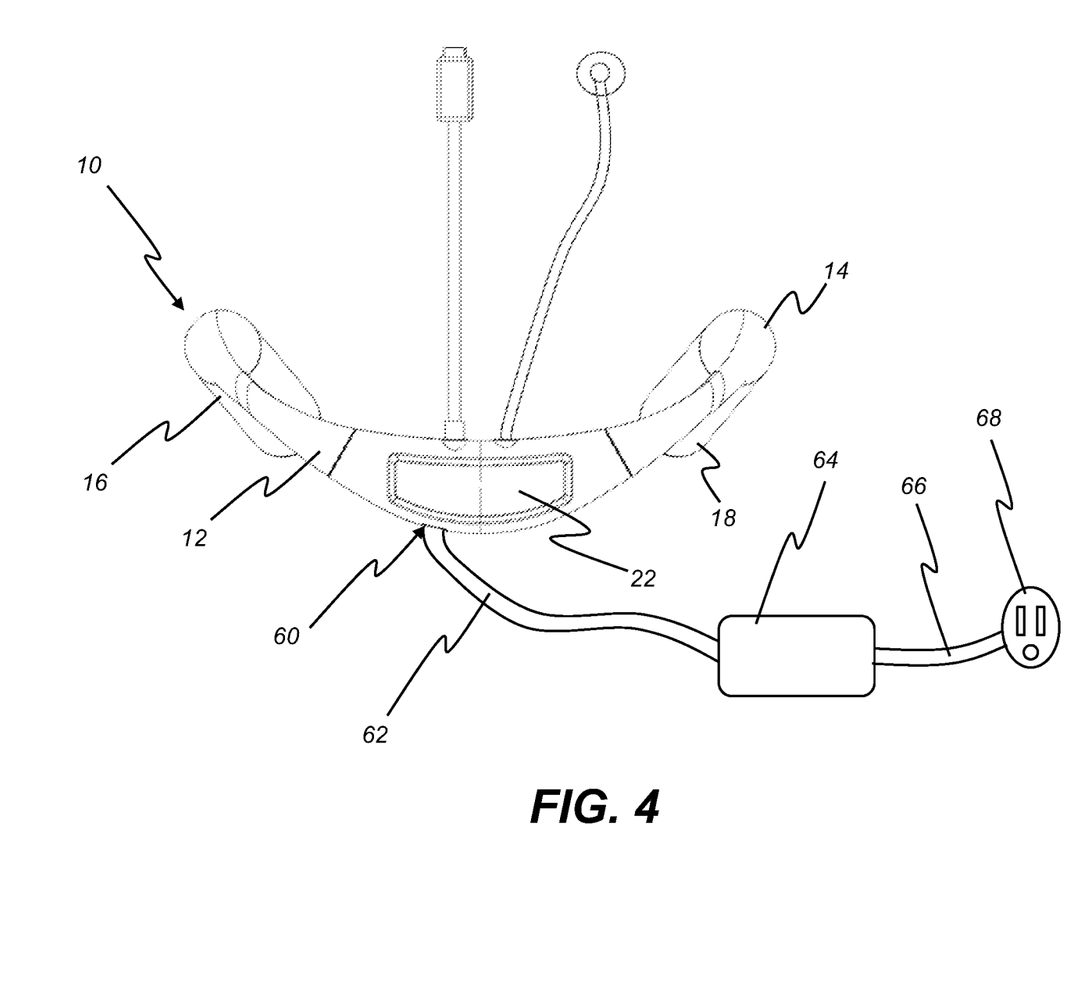
FIG. 4 illustrates a wearable mobile electronic system with an additional cable to power source.

FIG. 4 is a rear view illustration of the electronic torc system 10 with an electrical wire 62 connected to the external power supply port 60 via an electrical connector such as, but not limited to, a USB, mini-USB, USB Type-C, or magnetic connector. Electrical wire 62 may be connected to an electrical power transformer 64, and the electrical power transformer 64 may be connected to a wire 66 connected to an electrical plug 68. The internal rechargeable batteries 30 may be charged via the electrical wire 62, the electrical power transformer 64, the wire 66, and the electrical plug 68. Alternatively, electrical power for charging the internal rechargeable batteries 30 may be conveyed to the electronic torc system 10 via an external electronic device such as, but not limited to, a laptop, a smart phone, a charging station, or a portable powerbank. Electrical power for recharging internal rechargeable batteries may be conveyed to the electronic torc system 10 via an electromagnetic induction coil. The electromagnetic induction coil may be one module of the internal circuit board 36 (see FIG. 2A).

Figure 5:
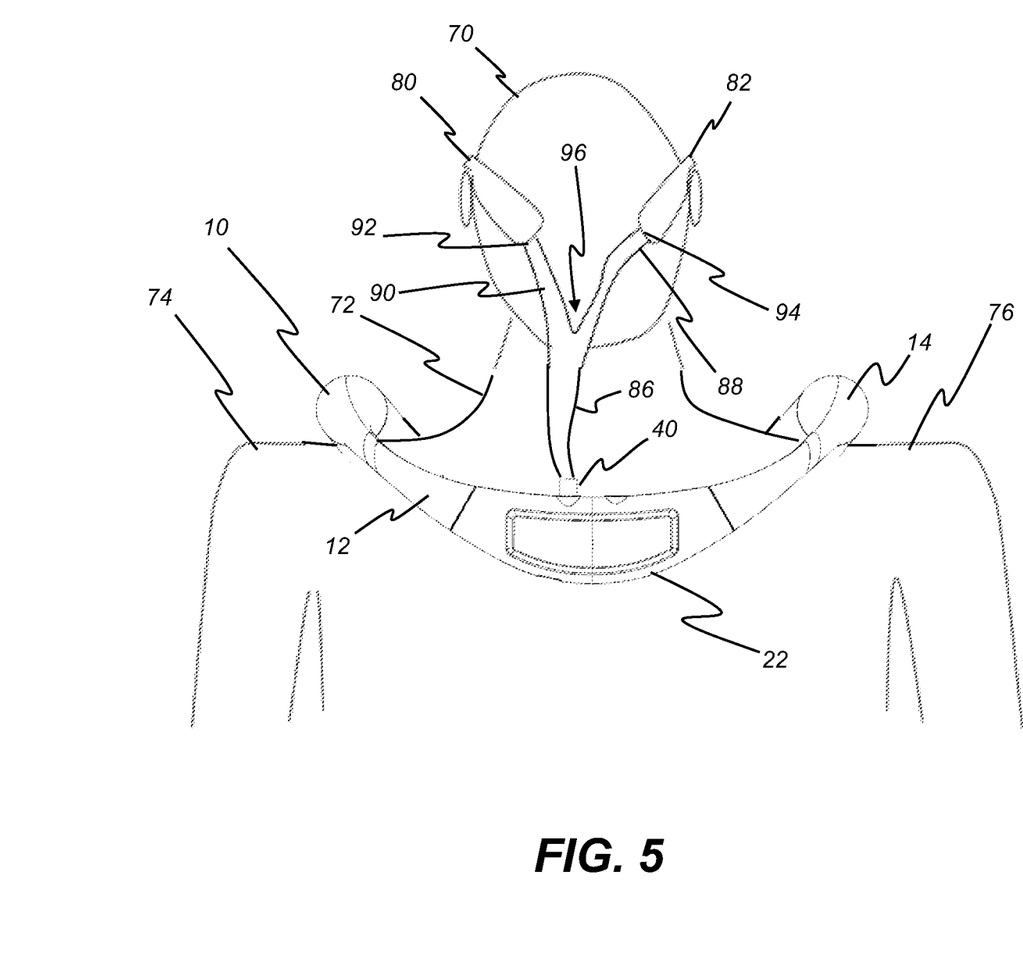
FIG. 5 illustrates a rear view of a person wearing a wearable mobile electronic system with connection to virtual reality glasses according to an embodiment of the present disclosure.

FIG. 5 is a rear view illustration of an electronic torc system 10 worn by a person 70. The electronic torc system 10 is draped over the left neck/shoulder 74 and the right neck/shoulder 76, and positioned at least partially around the neck 72 of person 70. In an embodiment, the left and right battery sections 16, 18 of the electronic torc system 10 are weighted to maintain the position of the electronic torc system 10 about the person's 70 neck. The weight of the left and right battery sections 16, 18 may pull at least a portion of the electronic section 22 of the electronic torc system 10 against the person 70. The left and right battery sections 16, 18 may be heavier than the electronic section 22 due to the weight of the batteries 30, due to the weight of the material forming the left and right battery sections 16, 18, or due to material added to the left and right battery sections 16, 18.

Referring still to FIG. 5, the person 70 may wear electronic glasses having a left temple 80 and a right temple 82. The electronic glasses temples 80, 82 may also be referred to as arms or temple arms. The electronic glasses may be, but are not limited to, virtual reality eyewear and/or augmented reality smartglasses comprising internal electronics such as, but not limited to, an image projector for generating virtual images, a computer (e.g., central processing unit, volatile and non-volatile memory, data storage, etc.), and a WiFi and/or Bluetooth communication module, requiring electrical power. Cable 86 is connected to the electrical port 40 of electronic torc system 10 to convey electrical power to, and/or send data to and receive data from, the electronic glasses. The electronic glasses may connect to electronic the torc system 10 by WiFi and/or Bluetooth connections for conveying data and/or commands to and/or from the electronic torc system 10. Cable 86 may bifurcate at a wire junction 96 providing a left wire 90 connection to left temple arm 80 and a right wire 88 connection to the right temple arm 82 via a left electrical connection 92 and a right electrical connection 94, respectively. In an embodiment, the electrical connections 92, 94 include coupling means for selectively coupling/decoupling the cable 86 from the electronic glasses.

Figure 6:
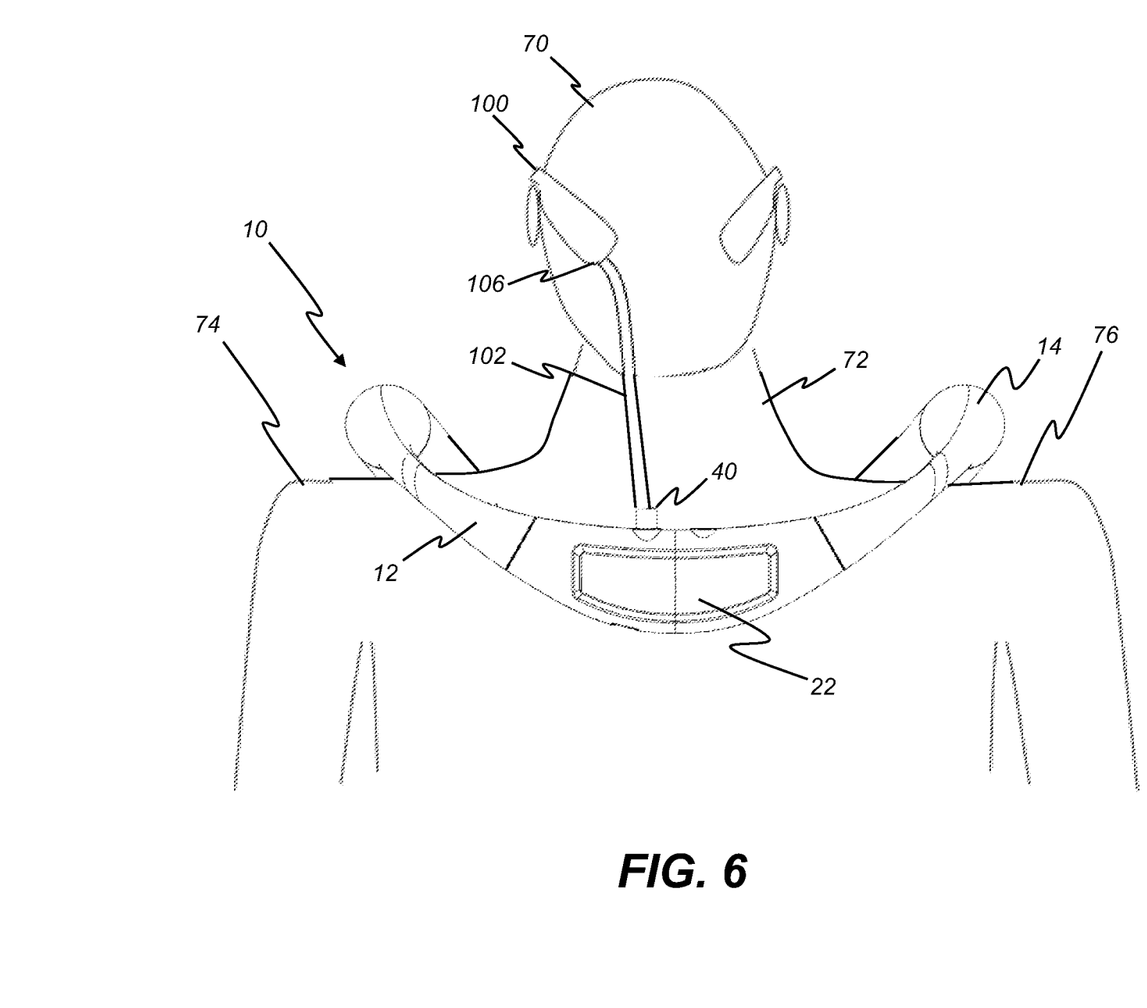
FIG. 6 illustrates a rear-view of a person wearing a wearable mobile electronic system with alternative connection to virtual reality glasses according to an embodiment of the present disclosure.

FIG. 6 is a rear view illustration of an electronic torc system 10 worn by a person 70. The electronic torc system 10 is located over the left neck/shoulder 74, the right neck/shoulder 76, and at least partially around the neck 72 of person 70. An electrical cable 102 is connected to the electronic torc system 10 via the electrical port 40 and to the electronic glasses left temple 100 at connection 106. The electrical cable 102 may convey electrical power to the electronic glasses from electronic torc system 10. The electrical cable 102 may convey data to the electronic glasses from the electronic torc system 10. The electrical cable 102 may convey data to the electronic torc system 10 from the electronic glasses. As illustrated in FIG. 10A, in an embodiment, the electronics section 22 of the electronic torc system 10 includes generally all of the computer hardware 300 required to operate the electronic glasses, such as, but not limited to, a central processing unit (CPU) 302, volatile and non-volatile memory 304, and data storage 306. As illustrated in FIG. 10B, in an embodiment, the electronic glasses CPU 302, memory 304, and data storage 306 is integral with the circuit board 36. In an embodiment where the electronic glasses CPU 302, memory 304, and data storage 306 is located in the electronic torc system 10, the electronic glasses may be in communication with the electronic torc system 10 via a local area network, such as, Wi-Fi.

Figure 7:
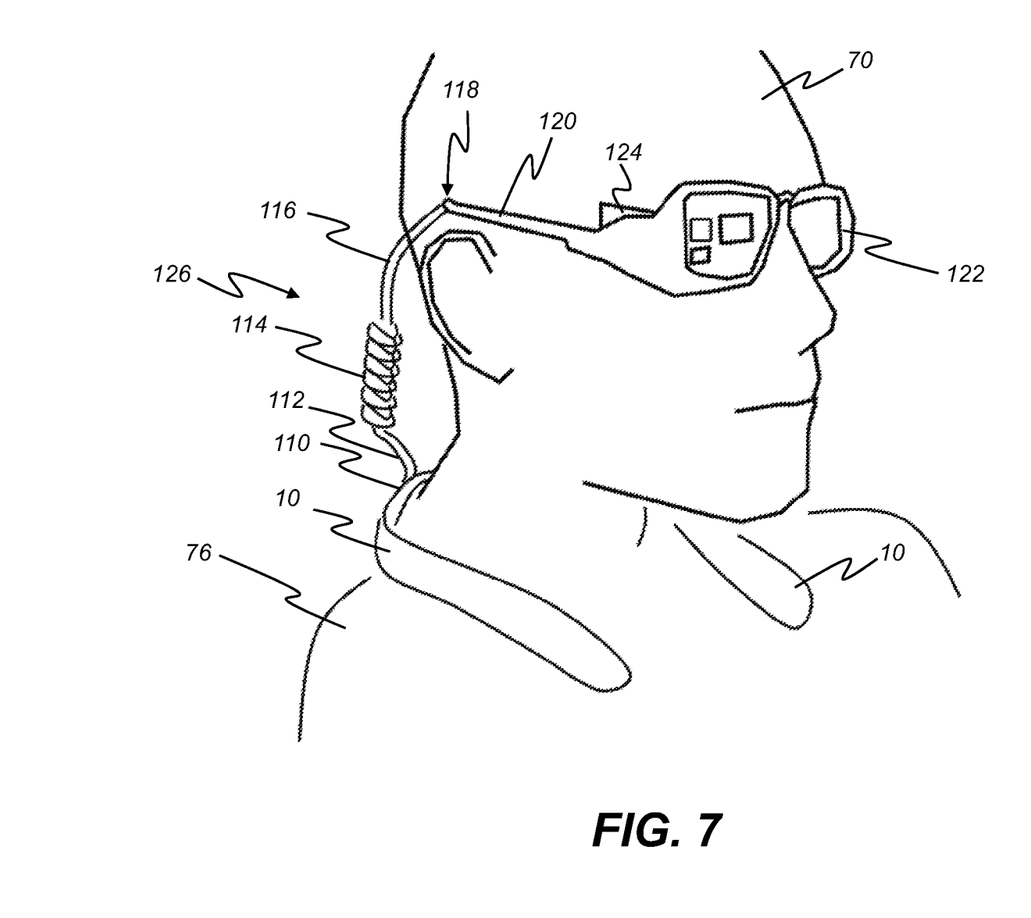
FIG. 7 illustrates a perspective view of a person wearing a wearable mobile electronic system with alternative connection to virtual reality glasses according to an embodiment of the present disclosure.

FIG. 7 is a perspective illustration of an electronic torc system 10 worn by a person 70. The person 70 is shown wearing electronic glasses 122. The electronic glasses 122 may be virtual reality glasses, augmented reality glasses, and/or a near-eye display comprising at least an image projector 124 and a right temple arm 120 having an electrical connection 118. In an embodiment, the image projector 124 is operable to generate a full range of angularly encoded beams for producing a virtual image. The electrical connection 118 is connected to a wire assembly 126 that is composed of at least a flexible wire section 116, an optional strain relief section 114 and a wire section 112. Wire assemble 126 is electrically connected to electronic torc system 10 by electrical connector 110.

Figure 8:
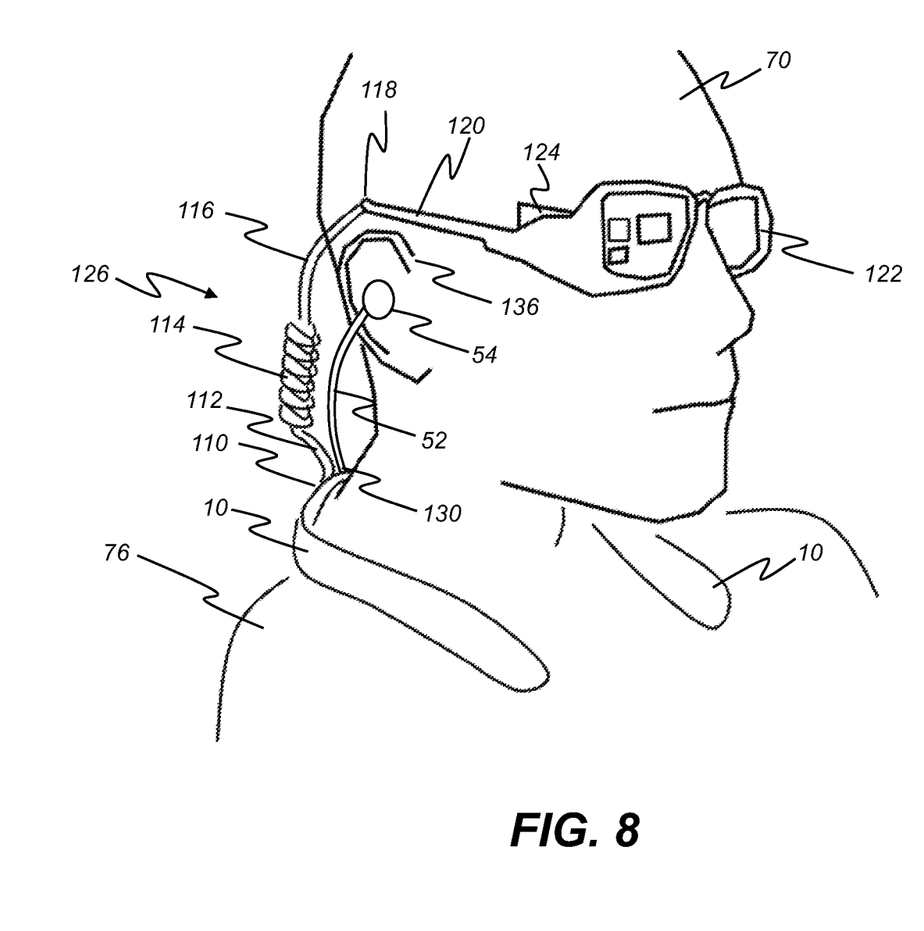
FIG. 8 illustrates a perspective view of a person wearing a wearable mobile electronic system with connection to virtual reality glasses and ear bud according to an embodiment of the present disclosure.

As illustrated in FIG. 8, the person 70 may wear an audio ear bud 134 in their right ear 136. The ear bud 54 is connected to wire assembly 52 that is connected to the electronic torc system 10 by an electrical connector 130 and the external audio connection port 50.

FIG. 9 is a perspective illustration of an electronic yoke system 140. The electronic yoke system 140 comprises right front section 142, left front section 144, right rear section 146, left rear section 148, and a connecting neck section 156. Right front section 142 is mechanically connected to right rear section 146 by right flexible section 150. Left front section 144 is mechanically connected to left rear section 148 by left flexible section 152. Right front section 142, left front section 144, and connecting neck section 156 define a space 158 for a user's neck when worn. Right front section 142, left front section 144, right rear section 146, left rear section 148, may comprise internal rechargeable batteries. Connecting neck section 156 may comprise one or more internal electronic circuit boards. Connecting neck section 156 may further comprise one or more electrical connection ports (see FIG. 2A) to connect to external electrical devices, e.g., electronic glasses.

Right front section 142, left front section 144, right rear section 146, left rear section 148, and connecting neck section 156 may be generally flat in shape allowing electronic yoke system 140 to be worn under clothing, e.g., a coat.

One or more features of the embodiments described supra may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, not restrictive. The scope of the invention is indicated by the appended claims, and all changes that come within the meaning and range of equivalents thereof are intended to be embraced therein.

What is claimed is:

1. A mobile electronic system, comprising:
a left battery section coupled with a left flexible section;
a right battery section coupled with a right flexible section;
an electronic section coupled with said left flexible section opposite said left battery section, and coupled with said right flexible section opposite said right battery section;
a battery located within said left battery section;
a touchpad located on one of said right battery section and said left battery section;
a circuit board located within said electronic section, wherein said circuit board comprises a controller; and
a left electrical wire assembly located within said left flexible section, wherein said left electrical wire assembly electrically connects said battery with said circuit board;
wherein said right and left flexible sections comprise a flexible material operable to retain a flexed position after adjustments to a position of said right and left flexible sections.

2. The mobile electronic system according to claim 1, wherein said battery is a first battery, and a second battery is located within said right battery section.

3. The mobile electronic system according to claim 2, wherein said first battery is integral with said left battery section, said second battery is integral with said right battery section, and said first battery and said second battery are rechargeable.

4. The mobile electronic system according to claim 3, wherein said controller is operable to control charging of said first battery and said second battery.

5. The mobile electronic system according to claim 3, wherein said circuit board comprises an electromagnetic induction coil operable to charge said first and second batteries.

6. The mobile electronic system according to claim 2, wherein said first battery is removable from said left battery section and said second battery is removable from said right battery section.

7. The mobile electronic system according to claim 2, comprising a right wire assembly located within said right flexible section.

8. The mobile electronic system according to claim 1, wherein said circuit board comprises one or more electronic connection ports operable to connect with an external electrical device.

9. The mobile electronic system according to claim 8, wherein said circuit board is operable to send signals to said external electrical device, said external electrical device is a near-eye display, and said circuit board comprises a central processing unit operable to control said near-eye display.

10. The mobile electronic system according to claim 1, wherein said circuit board comprises one or more integrated circuits providing memory, wireless networking, or a global position system receiver.

11. The mobile electronic system according to claim 1, wherein said circuit board comprises at least one of a Bluetooth module, a tip-tilt sensor module, and a magnetometer module.

12. The mobile electronic system according to claim 1, wherein said left and right battery sections are operable to be disposed about a wearer's neck.

13. The mobile electronic system according to claim 1, comprising a microphone located on one of said right battery section and said left battery section.

14. The mobile electronic system according to claim 1, wherein said flexible material of said right and left flexible sections comprises a semi-rigid tubing.

15. The mobile electronic system according to claim 1, wherein said left and right battery sections each include a removable cap comprising one or more light emitting diodes.

16. A mobile electronic system, comprising:
a left battery section coupled with a left flexible section;
a right battery section coupled with a right flexible section;
an electronic section coupled with said left flexible section opposite said left battery section, and coupled with said right flexible section opposite said right battery section;
a battery located within said left battery section;
a microphone located on one of said right battery section and said left battery section;

a circuit board located within said electronic section, wherein said circuit board comprises a controller; and a left electrical wire assembly located within said left flexible section, wherein said left electrical wire assembly electrically connects said battery with said circuit board;

wherein said right and left flexible sections comprise a flexible material operable to retain a flexed position after adjustments to a position of said right and left flexible sections.

17. The mobile electronic system according to claim 16, comprising a touchpad located on one of said right battery section and said left battery section.

18. The mobile electronic system according to claim 16, wherein said flexible material of said right and left flexible sections comprises a semi-rigid tubing.

19. The mobile electronic system according to claim 16, wherein said left and right battery sections each include a removable cap comprising one or more light emitting diodes.

20. The mobile electronic system according to claim 16, further comprising a near-eye display, wherein said circuit board comprises one or more electronic connection ports operable to connect with said near-eye display, wherein said near-eye display comprises an integrated battery, and wherein said battery is configured to connect with said integrated battery.

* * * * *